(12) United States Patent
Kaneda

(10) Patent No.: US 8,447,947 B2
(45) Date of Patent: May 21, 2013

(54) METHOD AND INTERFACE FOR ALLOCATING STORAGE CAPACITIES TO PLURAL POOLS

(75) Inventor: Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 439 days.

(21) Appl. No.: 12/707,185

(22) Filed: Feb. 17, 2010

(65) Prior Publication Data

US 2011/0202743 A1    Aug. 18, 2011

(51) Int. Cl.
*G06F 12/02* (2006.01)

(52) U.S. Cl.
USPC .......................................................... 711/170

(58) Field of Classification Search
None
See application file for complete search history.

(56) References Cited

U.S. PATENT DOCUMENTS

| | | | |
|---|---|---|---|
| 6,725,328 B2* | 4/2004 | Kano et al. | 711/112 |
| 2007/0233993 A1* | 10/2007 | Kato et al. | 711/170 |
| 2008/0168209 A1* | 7/2008 | Davison | 711/6 |
| 2009/0043958 A1 | 2/2009 | Kaneda et al. | |

* cited by examiner

*Primary Examiner* — Duc Doan
(74) *Attorney, Agent, or Firm* — Mattingly & Malur, PC

(57) ABSTRACT

Exemplary embodiments of the invention provide protocols and interfaces for avoiding waste capacity allocation from the storage apparatus to plural pools. In one embodiment, a storage system comprises a processor; a memory; and a storage controller. The storage controller is configured to: receive a declare chunk size command with a pool identifier for a pool among a plurality of pools, the declare chunk size command specifying a desired chunk size at the pool; receive an allocate chunk command with a pool identifier for allocating a chunk to a logical volume; and provide chunks of different chunk sizes to different pools with different pool identifiers, according to the desired chunk sizes of different declare chunk size commands and in response to different allocate chunk commands.

10 Claims, 25 Drawing Sheets

| Pool Identifier | Chunk Size |
|---|---|
|  |  |
|  |  |
|  |  |
| ⋮ | ⋮ |

Chunk Size Table

| Pool Identifier | Chunk Size |
|---|---|
| 222a | 1MB |
| 222b | 2MB |
|  |  |
| ⋮ |  |

Chunk Size Table

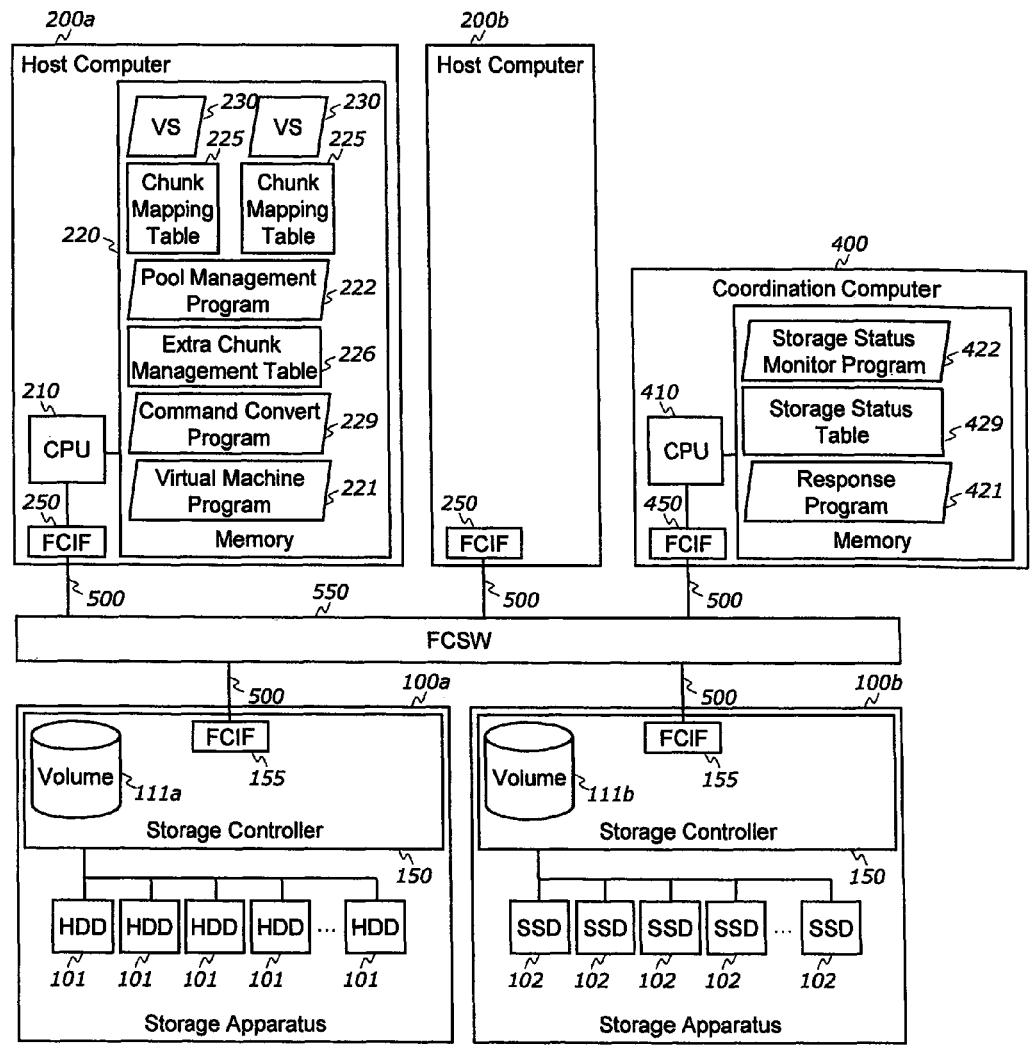

Fig.9

| Segment Number (22501) | Is Allocated (22502) | Chunk Number (22503) | Storage Number (22504) |
|---|---|---|---|
| 0 | | | |
| 1 | | | |
| 2 | | | |
| 3 | | | |
| 4 | | | |
| ⋮ | | | |

225

Chunk Mapping Table

Fig.10

| Chunk Number | LBA at Volume | Is Provided | Pool Identifier |
|---|---|---|---|
| 100a-10000 | | | |
| 100a-10001 | | | |
| 100a-10002 | | | |
| 100a-10003 | | | |
| 100a-10004 | | | |
| ⋮ | | | |

Chunk Management Table

Fig.11

| Storage Number | Volume Number | Free Capacity | Busy | Media Class |
|---|---|---|---|---|
| 100a | 111a | 10TB | 10% | HDD/7200rpm |
| 100b | 111b | 20TB | 50% | SSD/SLC |
| .. .. | | | | |

Storage Status Table

Fig.18

| | Chunk Number | Timestamp | Elapsed Time |
|---|---|---|---|
| 0 | | | |
| 1 | | | |
| 2 | | | |
| 3 | | | |
| 4 | | | |
| ⋮ | | | |
| 99 | | | |

Extra Chunk Management Table

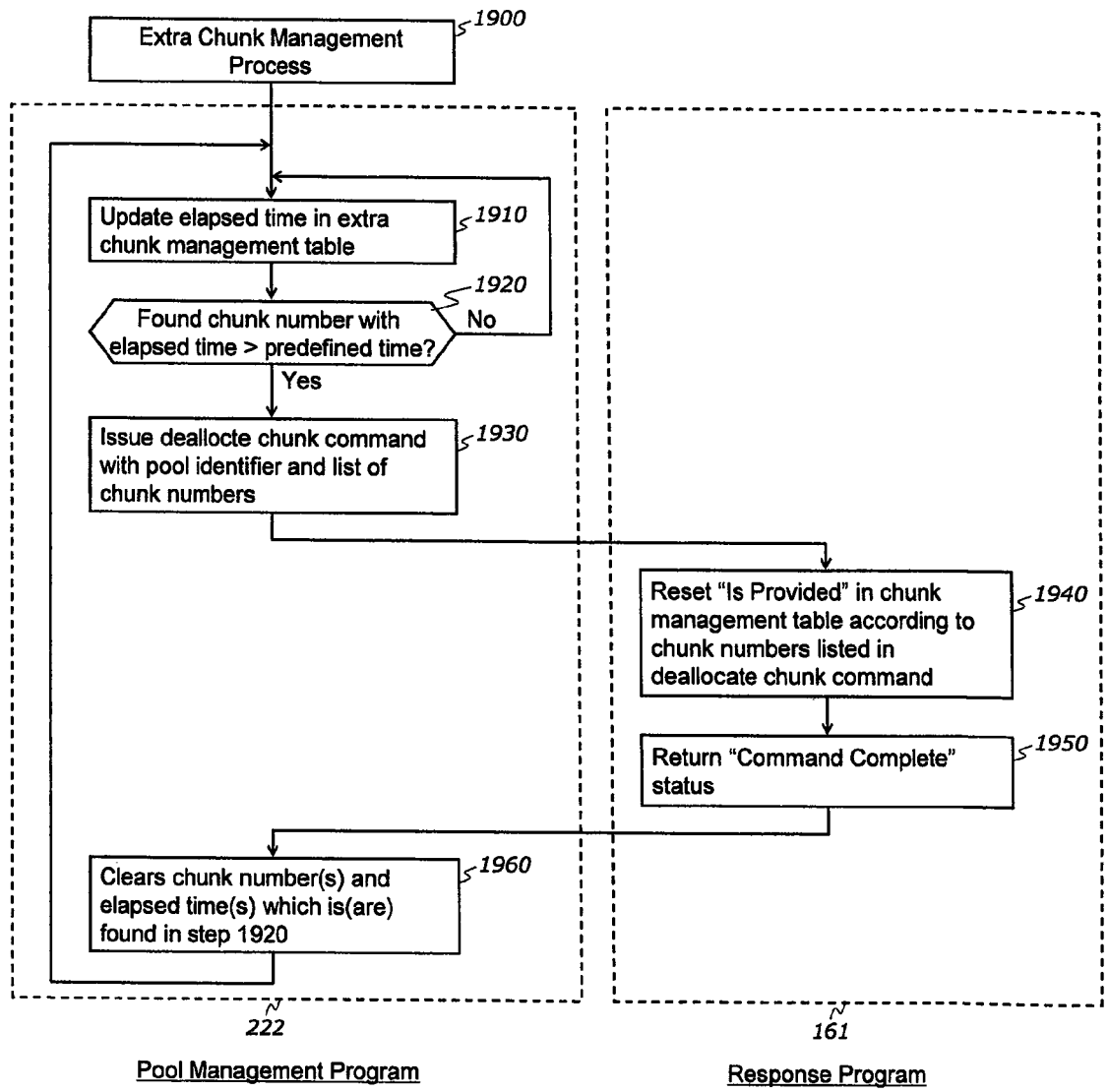

METHOD AND INTERFACE FOR ALLOCATING STORAGE CAPACITIES TO PLURAL POOLS

RELATED APPLICATION

The present application is related to U.S. patent application Ser. No. 12/692,839, filed Jan. 25, 2010, the entire disclosure of which is incorporated herein by reference.

BACKGROUND OF THE INVENTION

The present invention relates generally to protocols and interfaces between storage volume pools and a storage apparatus. More particularly, dynamic chunk allocation volumes are associated to the pools and the storage apparatus is shared among plural pools on host computers and/or storage apparatuses.

In the case of sharing one storage apparatus among plural pools, the storage apparatus provides its capacity to the pools. The storage apparatus generally divides its capacity into volumes and then provide them to each pool. An administrator may request capacity allocation to the storage apparatus via management interface that is provided by the storage apparatus or a management computer connected to the storage apparatus. The volume is managed by a pool management program once the capacity is allocated. The pool management program divides the pool volume into chunks. The pool provides plural dynamic chunk allocation volumes (DCAVs) to OS, application software, virtual servers, host computers, and the like. A DCAV has no chunk initially. A chunk is allocated to the DCAV when the DCAV receives a write command and a chunk has not been allocated at the write location specified in the write command.

In this situation, two problems arise. First, the volumes provided by the storage apparatus sometimes are not all used (some chunks in the volume are not used because the volume size is typically larger than the chunk size). To avoid a high frequency of volume allocation, the volume is provided at a different size from the chunk (typically larger size than chunk). Second, the pool management program must manage relations between the volume and chunks. The volume is divided into chunks for allocating to the DCAVs. As a result, the pool must manage and hold two tables, namely, the chunk mapping table and the chunk management table. The chunk mapping table holds relations between segments in the DCAVs and the chunks. The chunk management table holds relations between the chunks and the volumes. These tables consume memory. When the pool is implemented in a host computer, the memory in the host computer is consumed. When the pool is implemented in a storage apparatus (in the case of hierarchical storage configuration with upper and lower storage apparatuses), the memory in the upper storage apparatus is consumed. It is not reasonable to keep these two types of tables in one memory if the number of DCAVs and the total capacity managed by the pool become huge.

U.S. Pat. No. 6,725,328 discloses the basic idea for expanding volume size according to write location, and teaches steps for adding HDD (hard disk drive) to the pool. US2009/0043958 discloses a hierarchical storage system which is composed of plural upper storage apparatuses and lower storage apparatus. The upper storage apparatuses have the pool and provide DCAVs to the host computer. The lower storage apparatus provides volumes to the pools. However, these references do not disclose any methods, protocols, or interfaces for avoiding waste capacity allocation to pools. Furthermore, the pools in these references manage both chunk mapping table and chunk management table.

BRIEF SUMMARY OF THE INVENTION

Exemplary embodiments of the invention provide protocols and interfaces for avoiding waste capacity allocation from the storage apparatus to plural pools. In addition, the chunk management table is eliminated from the memory in the pool, thereby reducing memory consumption. This invention is used for data storage apparatus or systems for allocating capacities to capacity pools.

File systems and Hypervisors use a pool for optimizing capacity usage at thin provisioning volumes which are associated with the pool. Storage systems provide volumes to plural pools. However, current storage systems do not have the capability to align chunk size between pool and storage system. Thus, the capacities are not optimized among plural pools because volumes which are larger in size than a chunk are allocated to the pool. In the present invention, the storage system provides an interface for aligning chunk size between the pool and the storage system. Each pool specifies a desired chunk size to the storage system through the interface before establishing relation between storages. The storage system allocates an aligned chunk according to a new chunk allocation request. The pool allocates the chunk to their thin provisioning volume directly without any capacity conversion. Consequently, capacity usage among plural pools is optimized because the chunks are directly allocated to volumes without conversion. Moreover, pool management is simplified because the pool does not manage usage of chunks anymore.

In accordance with an aspect of the present invention, a storage system comprises a processor; a memory; and a storage controller. The storage controller is configured to: receive a declare chunk size command with a pool identifier for a pool among a plurality of pools, the declare chunk size command specifying a desired chunk size at the pool; receive an allocate chunk command with a pool identifier for allocating a chunk to a logical volume; and provide chunks of different chunk sizes to different pools with different pool identifiers, according to the desired chunk sizes of different declare chunk size commands and in response to different allocate chunk commands.

In some embodiments, at least two different desired chunk sizes are specified at two different pools. Each pool identifier identifies a pool in a host computer or a virtual machine of a host computer for the storage system to provide for the host computer or virtual machine a desired chunk size according to the declare chunk size command. In response to the allocate chunk command with a pool identifier, the storage controller checks if the received pool identifier matches one of a plurality of pool identifiers stored in the memory, and if no match is found, the storage controller sends a notice to a host computer which issues the allocate chunk command. If a match is found, the storage controller provides a chunk to the pool with the pool identifier, the chunk having the desired chunk size specified in the declare chunk size command. The chunk size is defined when the storage controller receives the declare chunk size command, and the storage controller provides a chunk of the defined chunk size to the pool with the pool identifier when the storage controller receives the allocate chunk command.

In specific embodiments, the storage controller is configured to forward the allocate chunk command with a pool identifier to another storage system. The storage controller receives the allocate chunk command with a pool identifier from another storage system and, in response to the allocate chunk command, checks if the received pool identifier matches one of a plurality of pool identifiers stored in the memory, and if no match is found, the storage controller sends a notice to a host computer which issues the allocate chunk command.

In accordance with another aspect of the invention, an information system comprises a plurality of host computers, and a storage apparatus coupled with the host computers, the storage apparatus comprising a processor; a memory; and a storage controller. The storage controller is configured to receive a declare chunk size command with a pool identifier for a pool among a plurality of pools, the declare chunk size command from the pool specifying a desired chunk size at the pool; receive an allocate chunk command with a pool identifier for allocating a chunk to a logical volume; and provide chunks of different chunk sizes to different pools with different pool identifiers, according to the desired chunk sizes of different declare chunk size commands and in response to different allocate chunk commands.

In some embodiments, at least two different desired chunk sizes are specified at two different pools. Each pool identifier identifies a pool in one of the host computers or a virtual machine of one of the host computers for the storage apparatus to provide for the host computer or virtual machine a desired chunk size according to the declare chunk size command. The pool preserves a plurality of chunks having the defined chunk size beforehand; the pool allocates one of the preserved chunks to a logical volume when the logical volume receives a write command and a chunk has not been allocated at a write location specified in the write command; and the pool deallocates any preserved chunks that are unused after elapsing a predefined time. In response to the allocate chunk command with a pool identifier, the pool with the pool identifier allocates to a logical volume a chunk having the desired chunk size according to the declare chunk size command.

In specific embodiments, the plurality of pools are provided in the plurality of host computers. The information system comprises a plurality of storage apparatuses coupled with the plurality of host computers, the plurality of storage apparatuses include a plurality of upper storage apparatuses and a lower storage apparatus, and the plurality of pools are provided in the plurality of upper storage apparatuses. The information system comprises a plurality of storage apparatuses, and the storage controller is configured to forward the allocate chunk command with a pool identifier to another storage apparatus of the plurality of storage apparatuses. The information system comprises a plurality of storage apparatuses, and the storage controller receives the allocate chunk command with a pool identifier from another storage apparatus of the plurality of storage apparatuses and, in response to the allocate chunk command, checks if the received pool identifier matches one of a plurality of pool identifiers stored in the memory, and if no match is found, the storage controller sends a notice to one of the host computers which issues the allocate chunk command.

In some embodiments, one of the host computers sends to the storage apparatus an allocate chunk command with a pool identifier for allocating a chunk to a logical volume when the logical volume receives a write command and a chunk has not been allocated at a write location specified in the write command. The information system comprises a plurality of storage apparatuses coupled with the plurality of host computers, and further comprises a chunk allocation coordination computer coupled with the storage apparatuses and the host computers. One of the host computers sends to the chunk allocation coordination computer an allocate chunk command with a pool identifier for allocating a chunk to a logical volume when the logical volume receives a write command and a chunk has not been allocated at a write location specified in the write command; and the chunk allocation coordination computer forwards the allocate chunk command to at least one of the storage apparatuses.

These and other features and advantages of the present invention will become apparent to those of ordinary skill in the art in view of the following detailed description of the specific embodiments.

BRIEF DESCRIPTION OF THE DRAWINGS

FIGS. 5(a) and 5(b) show examples of a chunk size table.

FIG. 7(a) illustrates an example of a hardware configuration of an information system in which the method and apparatus of the invention may be applied.

FIG. 9 shows an example of a chunk mapping table.

FIG. 10 shows an example of a chunk management table.

FIG. 11 shows an example of a storage status table.

FIG. 18 shows an example of an extra chunk management table.

FIG. 19 shows an example of a flow diagram illustrating an extra chunk management process in the pool management program.

DETAILED DESCRIPTION OF THE INVENTION

Figure 1:
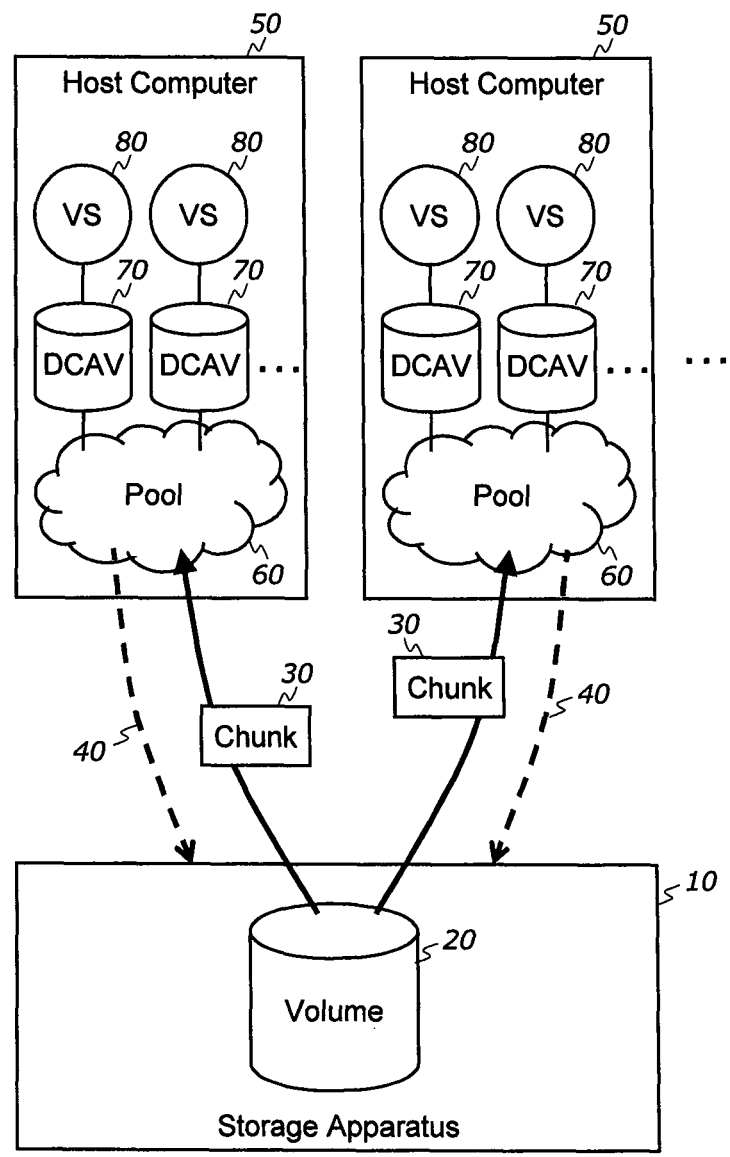
FIG. 1 shows an example of a logical configuration involving plural host computers and one storage apparatus.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs that utilize protocols and interfaces for avoiding waste capacity allocation from the storage apparatus to plural pools.

New protocols and interfaces are provided between the pool and the storage apparatus. The following commands are defined and used from the pool to the storage apparatus. The storage apparatus is operable to accept these commands. According to a declare chunk size command, the pool declares a desired chunk size to the storage apparatus before sending a chunk allocation request to the storage apparatus. According to an inquire chunk size command, the pool may send a current chunk size inquiry to storage apparatus. According to an allocate chunk command, the pool requests one or more chunk(s) allocation. According to a deallocate chunk command, the pool may deallocate (return) chunk(s) allocated by the allocate chunk commands. According to a read data in chunk command, the pool reads data from a chunk. According to a write data in chunk command, the pool writes data to a chunk.

The typical system of this invention is composed of plural pools in plural host computers and one storage apparatus. Each pool provides plural DCAVs. Each pool is managed by a pool management program. The pool management program holds a chunk mapping table for storing relations between DCAVs and chunks. The pool management program issues a declare chunk size command with pool identifier for specifying the desired chunk size at the pool. The pool management program issues an allocate chunk command with pool identifier for allocating chunk(s) to DCAV when the DCAV receives a write command and a chunk has not been allocated at the write location specified in the write command. The storage apparatus provides the appropriate size of chunk to the pool according to the pool identifier. The pool management program does not need to divide the chunk any more because the chunk provided from the storage apparatus is the desired size. The pool management program can allocate the chunk to DCAV directly. The pool management program does not need to manage a chunk management table. The pool management program has a command convert program for converting "read/write commands to DCAV" to "read/write command to chunk." The command convert program issues read data in chunk commands or write data chunk commands to the storage apparatus. The pool management program may request plural chunks with one allocate chunk command. The pool management program may deallocate unused chunk after elapsing a predefined time. The pool management program may inquire the current chunk size for verifying the chunk size setting.

Overview of Logical Configurations

FIGS. 1-4 show examples of logical configurations of this invention.

FIG. 1 shows an example of a logical configuration involving plural host computers and one storage apparatus. Plural host computers 50 are connected to one storage apparatus 10. In each host computer 50, a pool 60 has plural DCAVs 70. Each virtual server (VS) 80 stores OS (operating system), application program, and data in the corresponding DCAV 70. The storage apparatus 10 has a volume 20. The storage apparatus 10 is operable to accept a declare chunk size command from the pool 60. The pool 60 issues the declare chunk size command (command flow 40) with the desired chunk size and pool identifier. The storage apparatus 10 holds the pool identifier and requested chunk size in a chunk size table (see FIG. 5) in the storage apparatus 10. The storage apparatus 10 provides chunks 30 from the volume 20 to the pool 60. The size of the chunk 30 is aligned with the requested chunk size according to the declare chunk size command. The storage apparatus 10 identifies the chunk size according to the chunk size table and pool identifier in the allocate chunk command. The pool 60 allocates the chunk 30 provided from the storage apparatus 10 to the DCAV 70.

Figure 2:
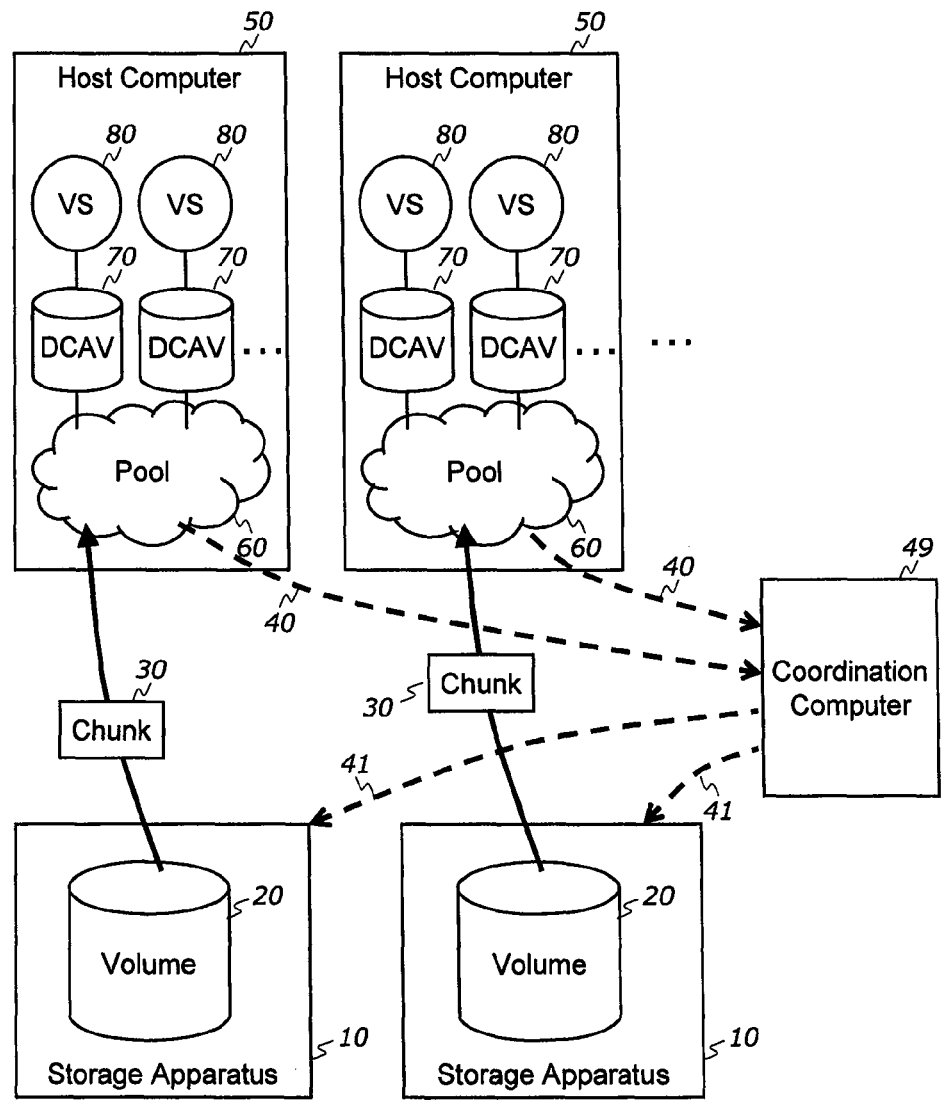
FIG. 2 shows an example of a logical configuration involving a coordination computer for plural host computers and plural storage apparatuses.

FIG. 2 shows an example of a logical configuration involving a coordination computer 49 for plural host computers 50 and plural storage apparatuses 10. In this coordination computer configuration, the pool 60 issues an allocate chunk command to the coordination computer 49 (command flow 40). The coordination computer 49 forwards the allocate chunk command to the storage apparatuses 10 according to the chunk consumption status, busy status, and/or media class (SSD, 15000 rpm, 7200 rpm, 5400 rpm) at the storage apparatus 10 (command flow 41). The storage apparatus that receives the allocate chunk command provides the chunk 30 from its volume 20 to the pool 60. In this configuration, each pool 60 issues a declare chunk size command to all the storage apparatuses 10 for specifying its own desired chunk size, or each pool 60 issues a declare chunk size command to the coordination computer 49. In the latter case, the coordination computer 49 issues the declare chunk size command to all the storage apparatuses 10 which the coordination computer 49 has discovered. The coordination computer 49 may gather free capacity, busy status, and media class information from the storage apparatuses periodically.

Figure 3:
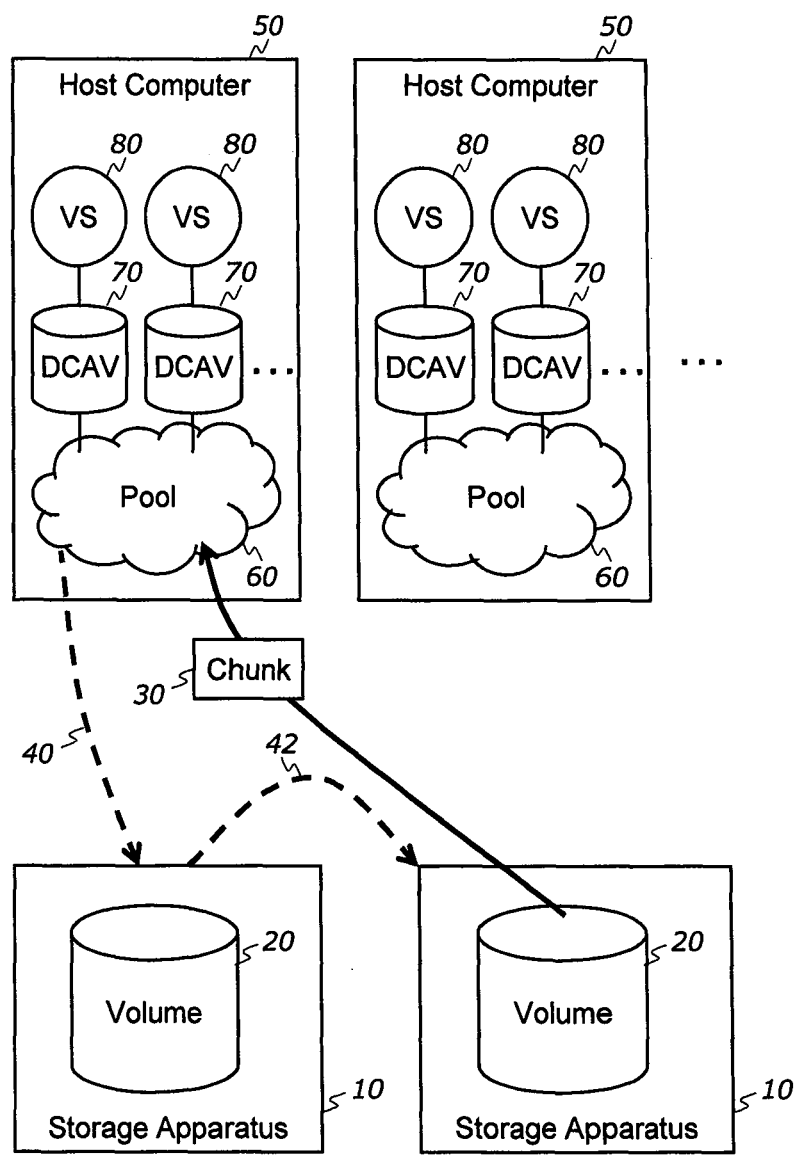
FIG. 3 shows an example of a logical configuration involving plural host computers and plural storage apparatuses with forwarding allocate chunk command from one storage apparatus to another.

FIG. 3 shows an example of a logical configuration involving plural host computers 50 and plural storage apparatuses 10 with forwarding allocate chunk command from one storage apparatus 10 to another. The pool 60 issues an allocate chunk command to a first one of the storage apparatuses 10 (command flow 40). The first storage apparatus 10 may forward the allocate chunk command to a second storage apparatus 10 according to free capacity, busy status, media class, and/or chunk size table at the storage apparatuses 10 (command flow 42). Further, the second storage apparatus may forward the allocate chunk command to another storage apparatus 10 (third), and so on (fourth, etc.). The storage apparatus that accepts the allocate chunk command provides the chunk 30 from the volume 20 to the pool 60. In this case, each pool 60 issues a declare chunk size command to all storage apparatus from which the pool wants to get chunk. The storage apparatus 10 has to forward the allocate chunk command if the pool identifier is not found in its own chunk size table (this means that the relation between pool and storage apparatus has not been established yet).

Figure 4:
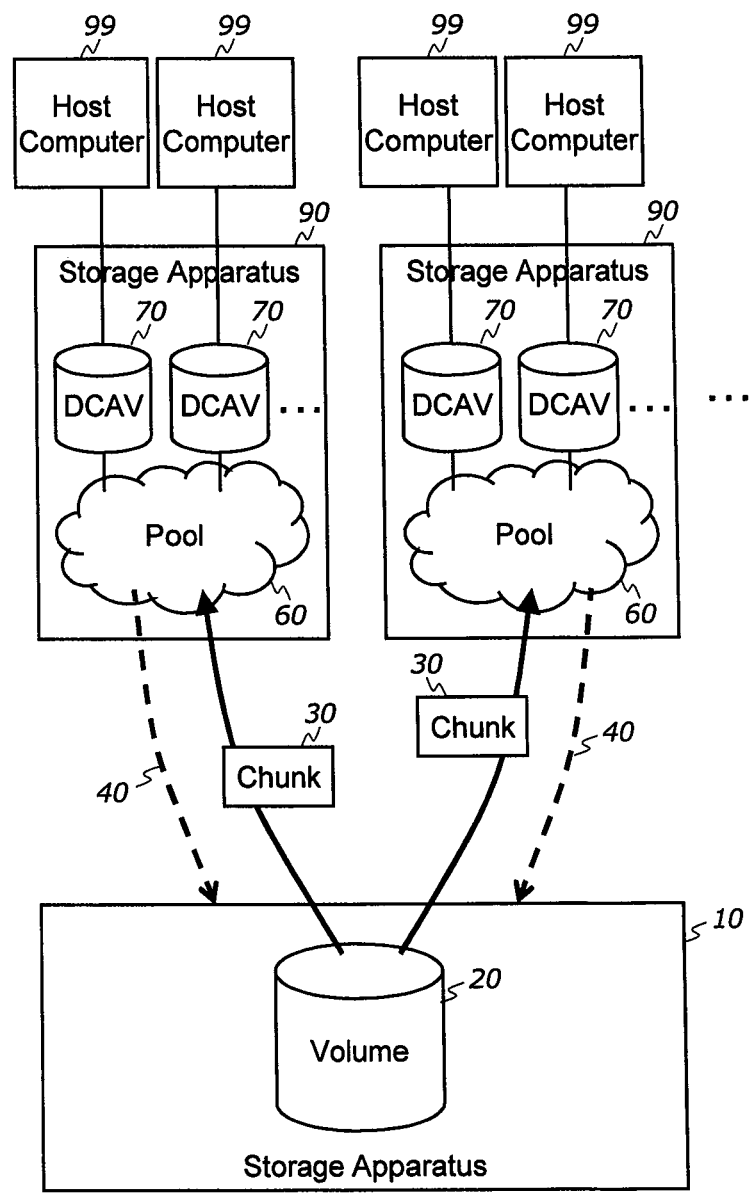
FIG. 4 shows an example of a logical configuration involving plural host computers and plural storage apparatuses with storage-to-storage chunk allocation.

FIG. 4 shows an example of a logical configuration involving plural host computers and plural storage apparatuses with storage-to-storage chunk allocation. In this storage to storage configuration, plural second storage apparatuses 90 are connected to a first storage apparatus 10. The pool 60 in each second storage apparatus 90 has plural DCAVs 70. Each host computer 99 is connected via the second storage apparatuses 90 to the first storage apparatus 10. Each host computer 99 stores OS, application program, and data in the corresponding DCAV 70. The first storage apparatus 10 has a volume 20. The pool 60 in each second storage apparatus 90 allocates chunk 30 provided from the first storage apparatus 10 to the DCAVs 70.

Command Specification

Figure 6A:
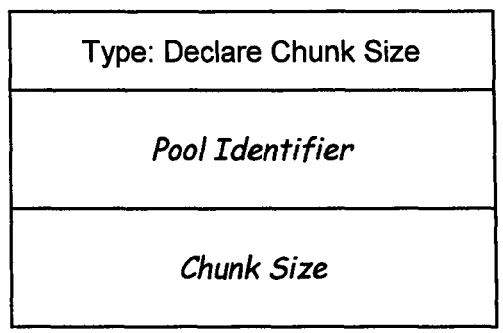
FIG. 6(a) shows an example of the declare chunk size command.

FIG. 6(a) shows an example of a declare chunk size command. The declare chunk size command is composed of three parts: command type, pool identifier, and chunk size. The declare chunk size command is used for declaring the desired chunk size to the storage apparatus. The storage apparatus holds the pool identifier and chunk size in the chunk size table in the storage apparatus. A Command Complete status is returned if the storage apparatus accepts the chunk size. A Size Not Accepted status is returned if the storage apparatus cannot accept the chunk size. The chunk size is overridden if the storage apparatus accepts another chunk size to an existing same pool identifier in the chunk size table.

Figure 6B:
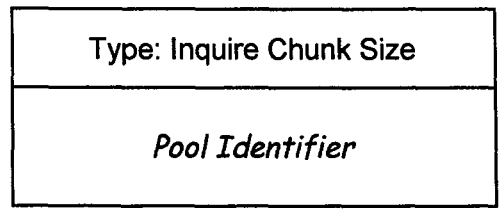
FIG. 6(b) shows an example of an inquire chunk size command.

FIG. 6(b) shows an example of an inquire chunk size command. The inquire chunk size command is composed of two parts: command type and pool identifier. The inquire chunk size command is used for inquiring the current chunk size of a storage apparatus. The storage apparatus returns the current chunk size from the chunk size table according to the pool identifier provided in the inquire chunk size command. A Command Complete status is also returned if the storage apparatus finds the corresponding pool identifier in the chunk size table. A Pool ID Not Found status is returned if the storage apparatus cannot find the corresponding pool identifier.

Figure 6C:
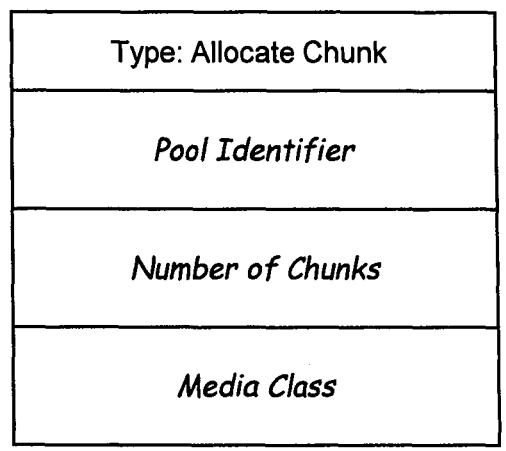
FIG. 6(c) shows an example of an allocate chunk command.

FIG. 6(c) shows an example of an allocate chunk command. The allocate chunk command is composed of four parts: command type, pool identifier, number of chunks, and media class (optional). The allocate chunk command is used for requesting provision of chunk(s) from the storage apparatus. The storage apparatus tries to provide chunk(s). The storage apparatus returns a storage number and a list of chunk numbers with a Command Complete status. Chunk number may be composed of chunk number and storage number. In this case, storage number can be extracted from chunk number. Chunk number is preferably identified uniquely. The size of chunk is aligned with the desired chunk size according to the declare chunk size command. An Allocation Failed status is returned if the storage apparatus cannot allocate the chunk(s). A Pool ID Not Found status is returned if the storage apparatus cannot find the corresponding pool identifier.

Figure 6D:
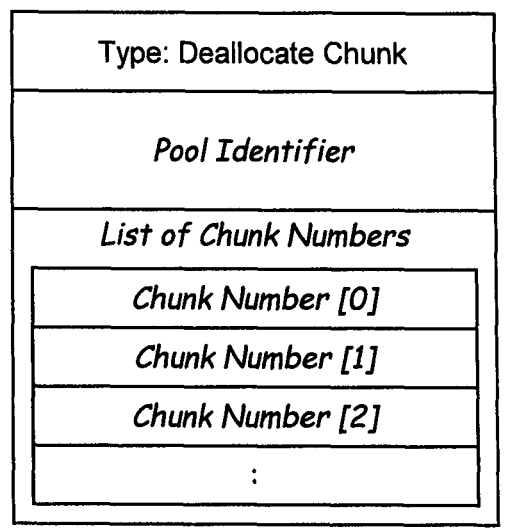
FIG. 6(d) shows an example of a deallocate chunk command.

FIG. 6(d) shows an example of a deallocate chunk command. The deallocate chunk command is composed of three parts: command type, pool identifier, and list of chunk numbers. The deallocate chunk command is used for returning chunk(s) to the storage apparatus. The storage apparatus resets the status of chunk provision. A Command Complete status is returned if the storage apparatus can reset all chunk(s) listed in the deallocate chunk command. A Chunk Number Not Found status is returned if the storage apparatus cannot find the corresponding chunk number in the chunk management table in the storage apparatus. A Pool ID Not Found status is returned if the storage apparatus cannot find the corresponding pool identifier.

Figure 6E:
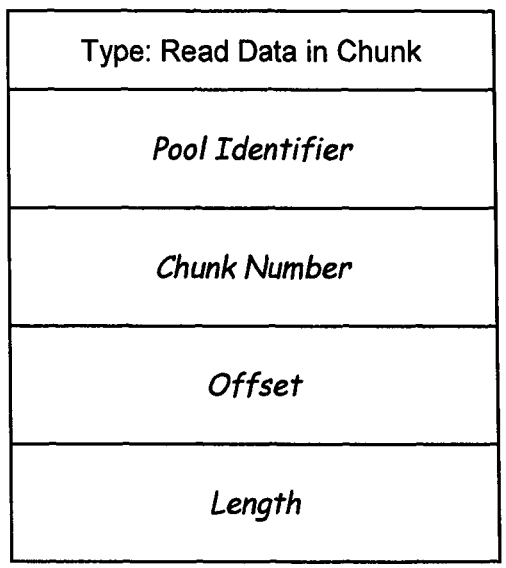
FIG. 6(e) shows an example of a read data in chunk command.

FIG. 6(e) shows an example of a read data in chunk command. The read data in chunk command is composed of five parts: command type, pool identifier, chunk number, offset, and length. The read data in chunk command is used for reading data in the storage apparatus. The storage apparatus returns part of data specified offset and length in chunk with a Command Complete status. A Read Error is returned if the storage apparatus cannot read data from the volume. A Pool ID Not Found status is returned if the storage apparatus cannot find the corresponding pool identifier. A Chunk Number Not Found status is returned if the storage apparatus cannot find the corresponding chunk number in the chunk management table in the storage apparatus.

Figure 6F:
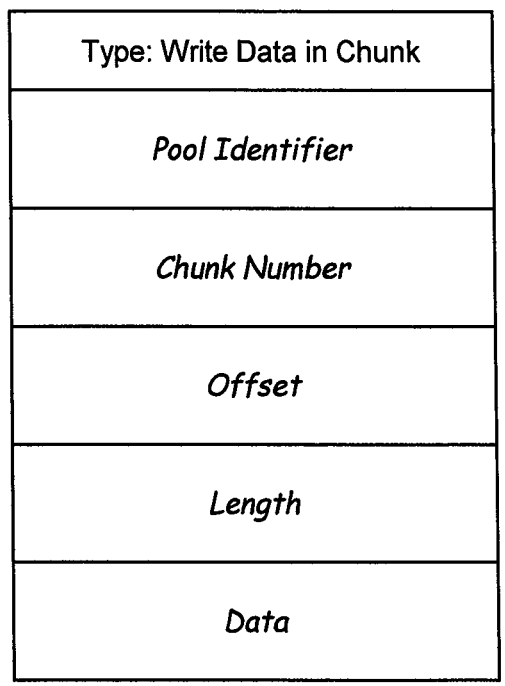
FIG. 6(f) shows an example of a write data in chunk command.

FIG. 6(f) shows an example of a write data in chunk command. The write data in chunk command is composed of six parts: command type, pool identifier, chunk number, offset, length, and data. The write data in chunk command is used for writing data to the storage apparatus. The storage apparatus writes data to part of chunk specified offset and length in chunk. A Command Complete status is returned if the storage apparatus completes the command to write data to volume. A Write Error is returned if the storage apparatus cannot write data to volume. A Pool ID Not Found status is returned if the storage apparatus cannot find the corresponding pool identifier. A Chunk Number Not Found status is returned if the storage apparatus cannot find the corresponding chunk number in the chunk management table in the storage apparatus.

Detailed System Configuration

FIG. 7(a) illustrates an example of a hardware configuration of an information system in which the method and apparatus of the invention may be applied. The information system is composed of host computers 200, storage apparatuses 100, a coordination computer 400, and a data network 500.

Two host computers 200a and 200b are connected to the storage apparatus 100 via the data network 500. In this embodiment, a virtual machine program 221 and a pool management program 222 are executed on the host computer. Plural virtual servers (VSs) 230 are executed on the virtual machine program 221. The pool management program 222 provides DCAVs to the VSs 230 logically. To provide DCAVs, the pool management program 222 utilizes chunk mapping tables 225. Each DCAV has one chunk mapping table 225. Files and data for each VS 230 are stored in corresponding DCAV provided by pool management program 222. Each pool management program 222 has a unique pool identifier. In this embodiment 222a and 222b are used as the identifiers.

Figure 7B:
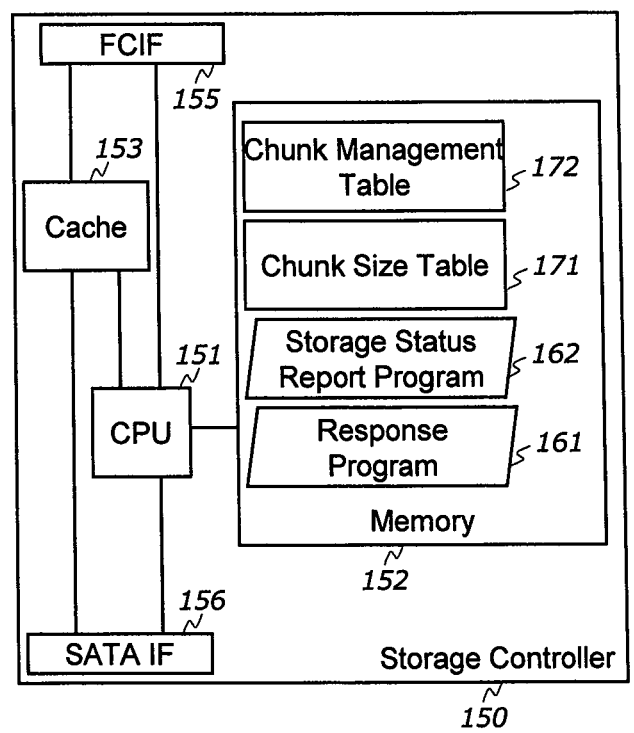
FIG. 7(b) shows details of the storage controller in the storage apparatus of FIG. 7(a).

The two storage apparatuses 100a and 100b are each composed of a storage controller 150 and one or more HDDs 101 or SSDs 102. Each storage apparatus 100 has one volume logically, which is associated with plural HDDs 101 or SSDs 102. FIG. 7(b) shows details of the storage controller 150. The coordination computer 400 may be used for coordinating the plural storage apparatuses 100. The coordination computer 400 is connected to the data network 500. The host computer 200, storage apparatuses 100, and coordination computer 400 are connected via the data network 500. The data network 500 in this embodiment is a Fibre Channel. Other network, such as Ethernet and Infiniband, can be used. The network switch and hub may be used for connecting the devices to each other. In FIG. 7(a), the Fibre Channel Switch (FCSW) 550 is used. The host computer 200, storage apparatus 100, and coordination server 400 each have one or more Fibre Channel interface board (FCIF) for connecting to the Fibre Channel data network 500.

The host computer 200 includes a CPU 210, a memory 220, and a FCIF 250 for connecting to data network 500. The memory 220 stores programs and data. The CPU 210 executes programs stored in the memory 220. The VSs 230 are also executed by the CPU 210. At least three programs are executed by the CPU 210. In this embodiment, the memory 220 stores a virtual machine program 221 for executing plural VSs 230, a pool management program 222 for providing plural DCAVs to the VSs, and a command convert program 229 for converting read/write command for being aligned with the chunk provided from the storage apparatuses.

The storage apparatus 100 includes plural HDDs 101 and/or SSDs 102 for storing data, and a storage controller 150 for providing chunks to plural pools. As seen in FIG. 7(b), the storage controller 150 includes a memory 152 for storing programs and data, a CPU 151 for executing programs stored in the memory 152, a FCIF 155 for connecting to the data network 500, a SATA IF 156 for connecting to the HDDs 101 and/or SSDs (if HDDs/SSDs have another interface such as FC, SCSI, SAS, appropriate interface should be used), and a cache 153 for storing data received from the host computer and read from the HDDs and/or SSDs. At least two programs are executed by the CPU 151. In this embodiment, the memory 152 stores a response program 161 for responding to commands, and a storage status report program 162 for reporting the storage status including free capacity, busy ratio, and media class to coordination computer 400. The memory 152 further stores the chunk management table 172 and the chunk size table 171.

The coordination computer 400 includes a memory 420 for storing programs and data, a CPU 410 for executing programs stored in the memory 420, and a FCIF 450 for connecting to the data network 500. At least two programs are executed by the CPU 410. In this embodiment, the memory 420 stores a response program 421 for responding to the declare chunk size command and allocate chunk command, and a storage status monitoring program 422 for gathering the storage status from the storage apparatuses periodically and updating a storage status table 429.

DCAV (Dynamic Chunk Allocation Volume)

Figure 8:
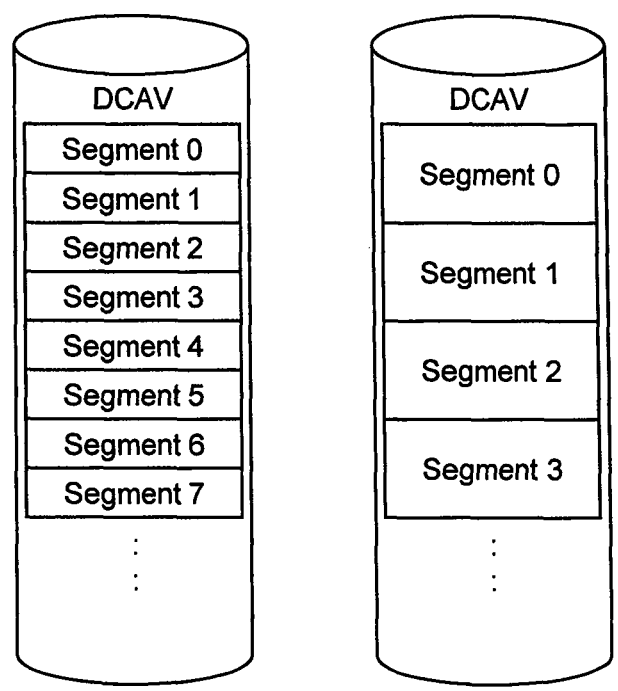
FIG. 8 shows an example of a logical configuration of the DCAV.

FIG. 8 shows an example of a logical configuration of the DCAV. The DCAV is divided into plural segments. Each segment has the same size. The pool management program 222a in the host computer 200a uses 1 MB in this embodiment. The pool management program 222b in the host computer 200b uses 2 MB in this embodiment. Any segment size can be used for optimizing the information system. The DCAV is created with no chunk initially. Chunks are allocated according to write requests. The pool management program 222 uses chunk mapping tables 225 for managing chunk allocation. One chunk mapping table is used for managing a corresponding DCAV.

FIG. 9 shows an example of a chunk mapping table 225. The pool management program 222 creates one chunk mapping table 225 when the pool management program 222 creates one DCAV. The chunk mapping table 225 is composed of a "Segment Number" column 22501 for storing a segment number for identifying the segment, an "Is Allocated" column 22502 for storing a status indicating whether a chunk has been allocated or not, a "Chunk Number" column 22503 for storing a chunk number provided from the storage apparatus, and a "Storage Number" column 22504 for storing a storage number from which the chunk is provided.

Chunk Size Table

FIGS. 5(a) and 5(b) show examples of the chunk size table 171 in the storage apparatus 100. The chunk size table 171 is composed of a "Pool Identifier" column 17101 for storing a pool identifier for identifying the pool and a "Chunk Size" column 17102 for storing the chunk size.

Chunk Management Table

FIG. 10 shows an example of the chunk management table 172 in the storage apparatus 100. The chunk management table 172 is composed of a "Chunk Number" column 17201 for storing chunk number for identifying the chunk, an "LBA at Volume" column 17202 for storing LBA range at the volume, an "Is Provided" column 17203 for storing a status indicating whether a chunk has been provided to the pool or not, and a "Pool Identifier" column 17204 for storing a pool identifier for identifying the pool which is using the chunk.

Storage Status Table

FIG. 11 shows an example of a storage status table 429 for storing the storage status in the coordination computer 400. The storage status table 429 may be used for determining the appropriate storage apparatus which provides chunk to pool. The storage status table 429 is composed of a "Storage Number" column 42901 for storing a storage number that the coordination computer discovers, a "Volume Number" column 42902 for storing a volume number in the storage apparatus for identifying the volume, a "Free Capacity" column 42903 for storing free capacity at the volume, a "Busy" column 42904 for storing busy ratio of the storage apparatus (0% means no load; 100% means full load), and a "Media Class" column for storing media class of the volume. HDDs and SSDs are used. In the case of HDDs, rotation speed is also used (15000 rpm, 7200 rpm, 5400 rpm, . . . ). In the case of SSDs, type of SSD is also used (SLC, MLC-2 bits, . . . ).

Establish Pool to Storage Apparatus Relations

Figure 12:
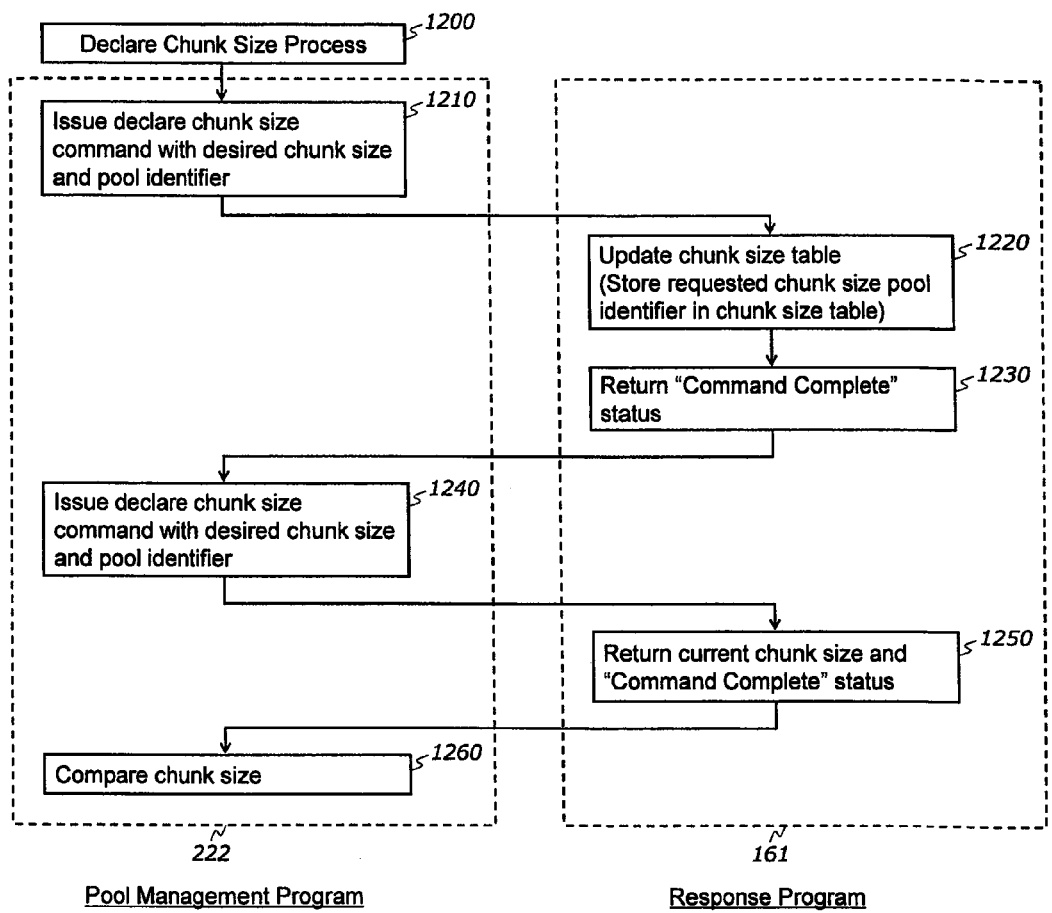
FIG. 12 shows an example of a flow diagram illustrating a declaring chunk size process.

The pool management program 222 discovers the storage apparatus by the ordinary manner. The administrator may register the storage apparatus that the pool management program should use. FIG. 12 shows an example of a flow diagram illustrating the declaring chunk size process 1200. As a result of the process, the relation of the pool management program 222 to the storage apparatus 100 is established.

In step 1210, the pool management program 222 of the host computer issues a declare chunk size command with the desired chunk size and pool identifier. The desired chunk size must be the segment size in the pool management program 222. In step 1220, the response program 161 of the storage controller updates the chunk size table 171 according to the received declare chunk size command. The response program 161 stores the requested chunk size and pool identifier in the chunk size table 171. In step 1230, the response program 161 returns the Command Complete status to the pool management program 222. In step 1240, the pool management program 222 issues an inquire chunk size command with the pool identifier for verifying the current chunk size. In step 1250, the response program 161 returns the current chunk size and Command Complete status to the pool management program 222. The response program 161 refers to the chunk size table 171. In step 260, the pool management program 222 compares the current chunk size and the desired chunk size. If the current chunk size differs from the desired chunk size, the pool management program 222 may retry.

In this embodiment, the pool management program 222a in the host computer 200a issues a declare chunk size command with 1 MB and "222a", the pool management program 222b in the host computer 200b issues a declare chunk size command with 2 MB and "222b." The chunk size table 171 is updated as shown in FIG. 5(b).

Write Data Process to DCAV

Figure 13:
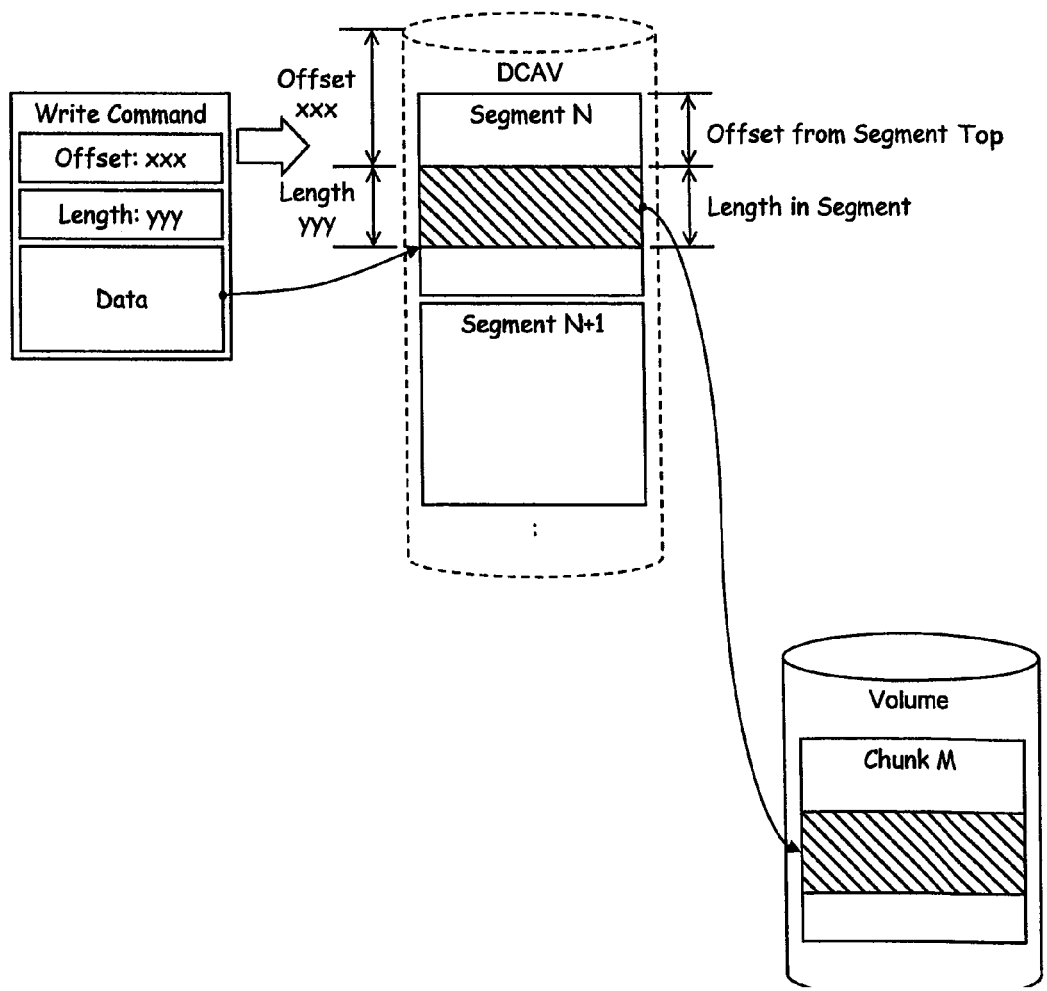
FIG. 13 shows an example of a write command from a virtual server (VS).

FIG. 13 shows an example of a write command from a VS 230. The write command requires the data write to part of a DCAV. Offset from DCAV top and length to be written are included in the write command. The command convert program 229 calculates the segment number, offset from segment top, and length to be written in segment. Data is written to plural segments if the data length is larger than the segment size.

Figure 14:
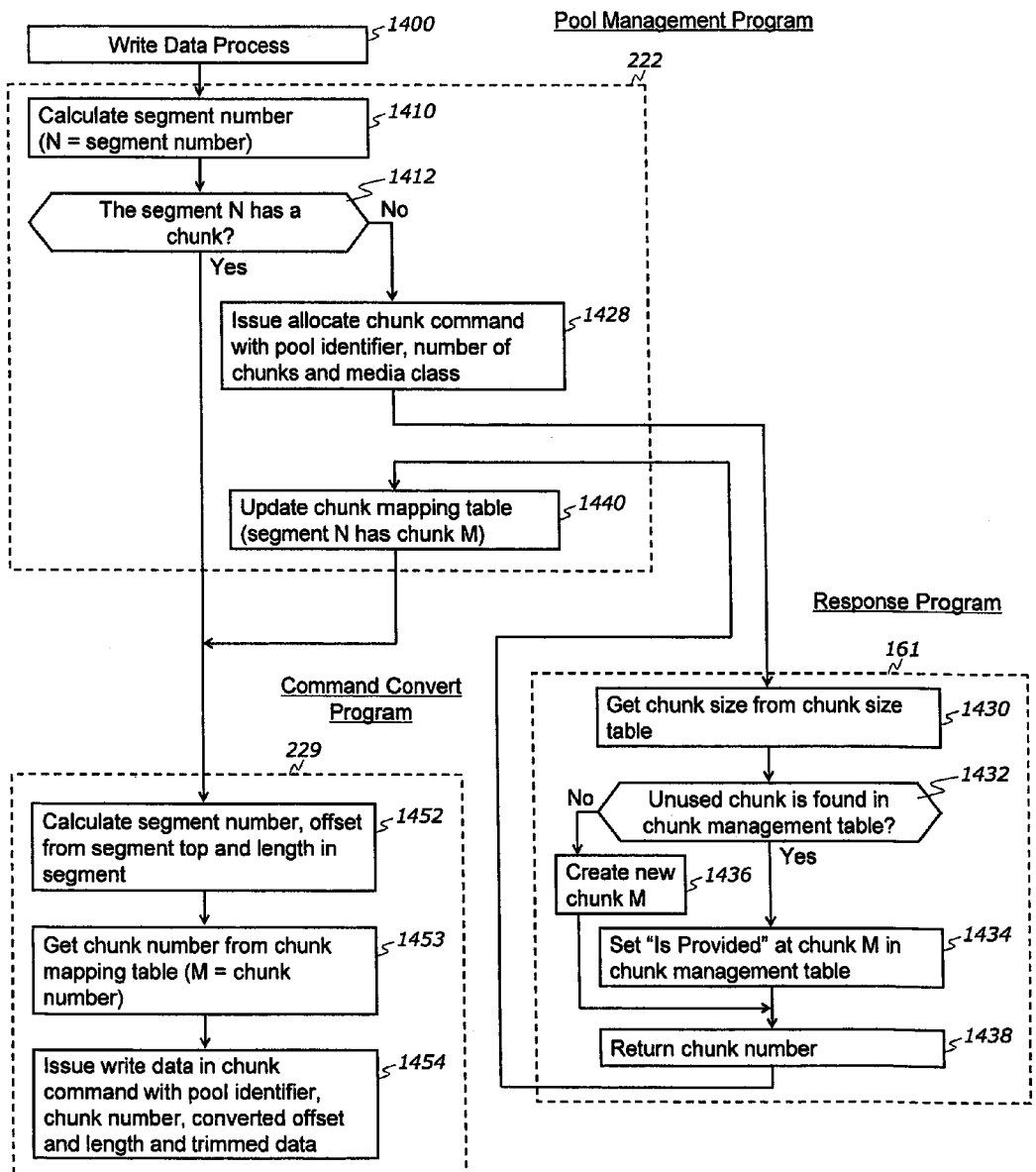
FIG. 14 shows an example of a flow diagram illustrating a write data process to DCAV.

FIG. 14 shows an example of a flow diagram illustrating a write data process to DCAV. In step 1410, the pool management program 222 calculates the segment number (segment N). In step 1412, the pool management program 222 checks if the segment N has a chunk already. The chunk mapping table 225 is used for the check. If there is no chunk at the segment N, the process proceeds to step 1428. If a chunk exists at the segment N, the process proceeds to step 1452. In step 1428, the pool management program 222 issues an allocate chunk command with the pool identifier, number of chunks (=1), and media class (=null) to the storage apparatuses 100. In step 1430, the response program 161 gets the chunk size from chunk size table 171 according to the pool identifier in the allocate chunk command. In step 1432, the response program 161 searches an unused chunk with the size from the chunk management table 172. If an unused chunk is found, the process proceeds to step 1434. If an unused chunk is not found, the process proceeds to step 1436. In step 1434, the response program 161 sets "Is Provided" in the chunk management table 172. In step 1436, the response program 161 creates a new chunk by updating the chunk management table. Next, in step 1438, the response program 161 returns the chunk number (=M). In step 1440, the pool management program 222 updates the chunk mapping table 225 (segment N has chunk M).

In step 1452, the command convert program 229 calculates the segment number, offset from segment top, and length in segment. In step 1453, the command convert program 229 gets the chunk number from the chunk mapping table 225 (chunk number is M). In step 1454, the command convert program 229 issues write data in the chunk command with the pool identifier, chunk number (=M), converted offset, and length. Data is also trimmed according to the converted offset and length and sent to the storage apparatuses 100.

Read Data Process to DCAV

Figure 15:
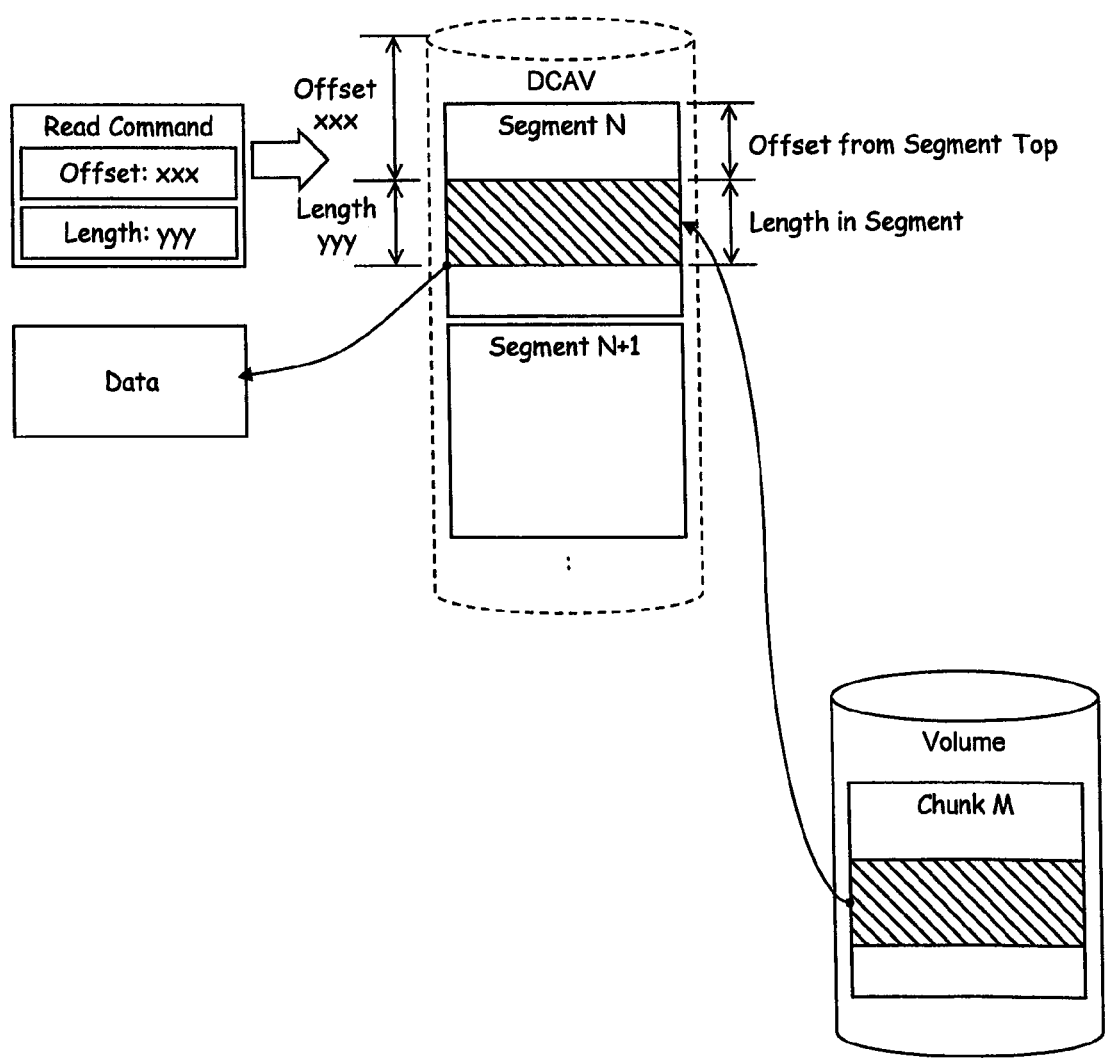
FIG. 15 shows an example of a read command from a virtual server (VS).

FIG. 15 shows an example of a read command from the VS 230. The read command requires data read from part of the DCAV. Offset from DCAV top and length to be read are included in the read command. The command convert program 229 calculates the segment number, offset from segment top, and length to be read in segment. Data is read from plural segments if the data length is larger than the segment size.

Figure 16:
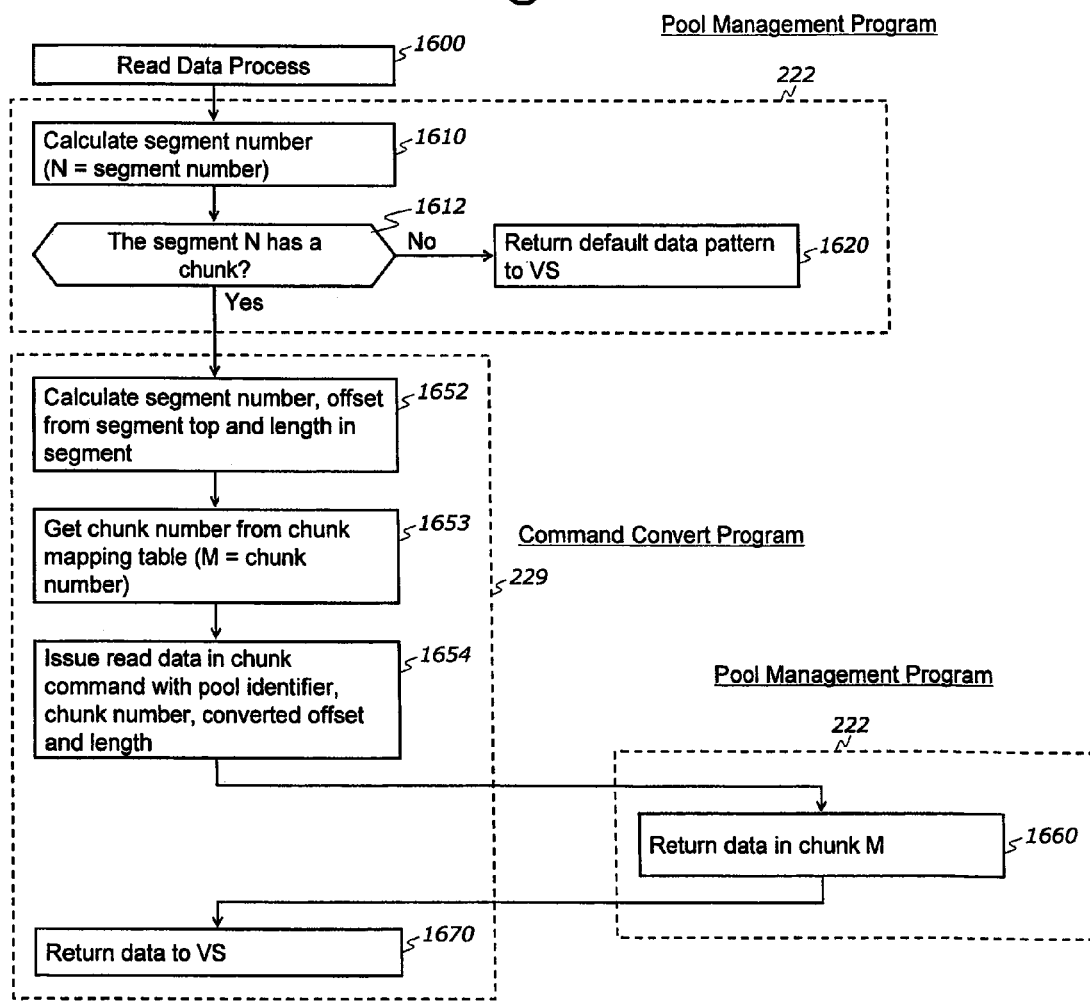
FIG. 16 shows an example of a flow diagram illustrating a read data process from DCAV.

FIG. 16 shows an example of a flow diagram illustrating a read data process from DCAV. In step 1610, the pool management program 222 calculates the segment number (segment N). In step 1612, the pool management program 222 checks if the segment N has a chunk already. The chunk mapping table 225 is used for the check. If there is no chunk at the segment N, the process proceeds to step 1620. If a chunk exists at the segment N, the process proceeds to step 1652. In step 1620, the pool management program 222 returns a default data pattern (e.g., all zeros) as read data to the VS 230. In step 1652, the command convert program 229 of the host computer calculates the segment number, offset from segment top, and length in segment. In step 1653, the command convert program 229 gets the chunk number from the chunk mapping table 225 (chunk number is M). In step 1654, the command convert program 229 issues read data in the chunk command with the pool identifier, chunk number (=M), converted offset, and length. In step 1660, the response program 161 returns data in chunk (=M) to the command convert program 229 according to the chunk number, offset, and length in read data in the chunk command. In step 1670, the command convert program 229 returns data to the VS.

Write Data Process with Coordination Computer and Extra Chunk Management Table

Figure 17:
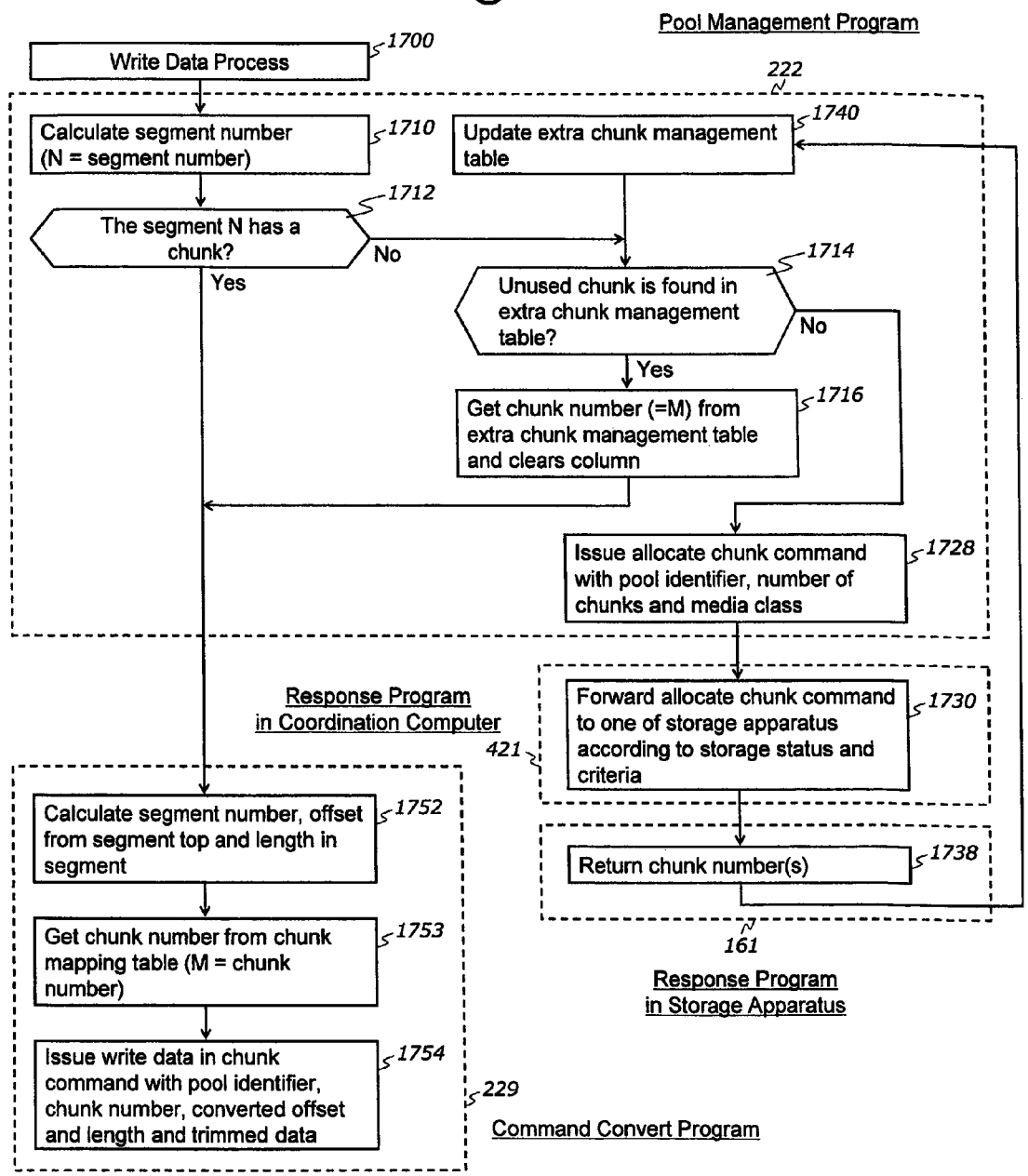
FIG. 17 shows an example of a flow diagram illustrating a write data process to DCAV in the case involving a coordination computer.

FIG. 17 shows an example of a flow diagram illustrating a write data process to DCAV in the case involving a coordination computer 400. An extra chunk management table 226 is used in the pool management program 222. FIG. 18 shows an example of an extra chunk management table 226 with number column 22601, Chunk Number column 22602, Timestamp column 22603, and Elapsed Time column 22604. The extra chunk management table 226 can hold plural (e.g., 100) chunk numbers and timestamps. The elapsed time from chunk gotten to now is stored and updated every second.

In step 1710, the pool management program 222 calculates the segment number (segment N). In step 1712, the pool management program 222 checks if the segment N has a chunk already. The chunk mapping table 225 is used for the check. If there is no chunk at the segment N, the process proceeds to step 1714. If a chunk exists at the segment N, the process proceeds to step 1752. In step 1714, the pool management program 222 searches an unused chunk from the extra chunk management table 226. If an unused chunk is found, the process proceeds to step 1716. If an unused chunk is not found, the process proceeds to step 1728. In step 1716, the pool management program 222 gets a chunk number (=M) from the extra chunk management table 226 and clears the column, and the process proceeds to step 1752.

In step 1728, the pool management program 222 issues an allocate chunk command with a pool identifier, number of chunks (=number of empty columns in the extra chunk management table 226), and desired media class to the coordination computer 400. In step 1730, the response program 421 in the coordination computer 400 forwards the allocate chunk command to one of the storage apparatuses 100 according to the storage status table 429. Examples of criteria include storage apparatus with desired media class specified in the allocate chunk command, storage apparatus with lower busy ratio, and storage apparatus with larger free capacity. In step 1738, the response program 161 in the storage apparatus which receives the chunk allocation command returns the chunk number(s). In step 1740, the pool management program 222 updates the extra chunk management table 226. Current time is stored into the extra chunk management table 226 with the chunk number. The process returns to step 1714.

In step 1752, the command convert program 229 calculates the segment number, offset from segment top, and length in segment. In step 1753, the command convert program 229 gets the chunk number from the chunk mapping table 225 (chunk number is M). In step 1754, the command convert program 229 issues write data in the chunk command with the pool identifier, chunk number (=M), converted offset, and length. Data is also trimmed according to the converted offset and length and set to the storage apparatuses 100.

Extra Chunk Management Process

FIG. 19 shows an example of a flow diagram illustrating an extra chunk management process in the pool management program 222. In step 1910, the pool management program 222 updates the elapsed time in the extra chunk management table 226 every second. In step 1920, the pool management program 222 searches chunk numbers which have longer elapsed time than the predefined elapsed time. If there is no chunk number, the process returns to step 1910. If one or more chunk numbers are found, the process proceeds to step 1930. In step 1930, the pool management program 222 issues a deallocate chunk command with the pool identifier and list of chunk numbers. In step 1940, the response program 161 resets "Is Provided" in the chunk management table 172 according to the chunk numbers listed in deallocate chunk command. In step 1950, the response program 161 returns Command Complete status to the pool management program 222. In step 1960, the pool management program 222 clears the chunk number(s) and elapsed time(s) found in step 1920, and the process returns to step 1910.

Of course, the system configurations illustrated in FIGS. 1-4 and 7 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for utilizing protocols and interfaces to avoid waste capacity allocation from the storage apparatus to plural pools. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An information system comprising:
a plurality of host computers; and
a storage apparatus coupled with the host computers, the storage apparatus comprising a processor; a memory; and a storage controller which is configured to
receive a declare chunk size command with a pool identifier for a pool among a plurality of pools, the declare chunk size command from the pool specifying a desired chunk size at the pool;
receive an allocate chunk command with a pool identifier for allocating a chunk to a logical volume; and
provide chunks of different chunk sizes to different pools with different pool identifiers, according to the desired chunk sizes of different declare chunk size commands and in response to different allocate chunk commands;
wherein the chunk size is defined when the storage controller receives the declare chunk size command;
wherein the storage controller provides a chunk of the defined chunk size to the pool with the pool identifier when the storage controller receives the allocate chunk command;
wherein the pool preserves a plurality of chunks having the defined chunk size beforehand;
wherein the pool allocates one of the preserved chunks to a logical volume when the logical volume receives a write command and a chunk has not been allocated at a write location specified in the write command; and
wherein the pool deallocates any preserved chunks that are unused after elapsing a predefined time.

2. The information system according to claim 1, wherein at least two different desired chunk sizes are specified at two different pools.

3. The information system according to claim 1,
wherein in response to the allocate chunk command with a pool identifier, the storage controller checks if the received pool identifier matches one of a plurality of pool identifiers stored in the memory;
wherein if no match is found, the storage controller sends a notice to one of the host computers which issues the allocate chunk command; and
wherein if a match is found, the storage controller provides a chunk to the pool with the pool identifier, the chunk having the desired chunk size specified in the declare chunk size command.

4. The information system according to claim 1,
wherein in response to the allocate chunk command with a pool identifier, the pool with the pool identifier allocates to a logical volume a chunk having the desired chunk size according to the declare chunk size command.

5. The information system according to claim 1, comprising a plurality of storage apparatuses,
wherein the storage controller is configured to forward the allocate chunk command with a pool identifier to another storage apparatus of the plurality of storage apparatuses.

6. The information system according to claim 1, comprising a plurality of storage apparatuses,
wherein the storage controller receives the allocate chunk command with a pool identifier from another storage apparatus of the plurality of storage apparatuses and, in response to the allocate chunk command, checks if the received pool identifier matches one of a plurality of pool identifiers stored in the memory, and if no match is found, the storage controller sends a notice to one of the host computers which issues the allocate chunk command.

7. The information system according to claim 1,
wherein one of the host computers sends to the storage apparatus an allocate chunk command with a pool identifier for allocating a chunk to a logical volume when the logical volume receives a write command and a chunk has not been allocated at a write location specified in the write command.

8. The information system according to claim 1, comprising a plurality of storage apparatuses coupled with the plurality of host computers, and further comprising:
a chunk allocation coordination computer coupled with the storage apparatuses and the host computers;
wherein one of the host computers sends to the chunk allocation coordination computer an allocate chunk command with a pool identifier for allocating a chunk to a logical volume when the logical volume receives a write command and a chunk has not been allocated at a write location specified in the write command; and
wherein the chunk allocation coordination computer forwards the allocate chunk command to at least one of the storage apparatuses.

9. The information system according to claim 1,
wherein the plurality of pools are provided in the plurality of host computers.

10. The information system according to claim 1, comprising a plurality of storage apparatuses coupled with the plurality of host computers,
wherein the plurality of storage apparatuses include a plurality of upper storage apparatuses and a lower storage apparatus; and
wherein the plurality of pools are provided in the plurality of upper storage apparatuses.

* * * * *